US011036737B2

(12) United States Patent
Chainani et al.

(10) Patent No.: US 11,036,737 B2
(45) Date of Patent: *Jun. 15, 2021

(54) PARTITIONED BLOOM FILTER MERGE FOR MASSIVELY PARALLEL PROCESSING CLUSTERED DATA MANAGEMENT

(71) Applicant: INTERNATIONAL BUSINESS MACHINES CORPORATION, Armonk, NY (US)

(72) Inventors: Naresh K. Chainani, Portland, OR (US); Kiran K. Chinta, Hillsboro, OR (US); Ian R. Finlay, Uxbridge (CA); David Kalmuk, Markham (CA); Timothy R. Malkemus, Leander, TX (US); Calisto Zuzarte, Pickering (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/407,263

(22) Filed: May 9, 2019

(65) Prior Publication Data

US 2019/0266159 A1    Aug. 29, 2019

Related U.S. Application Data

(63) Continuation of application No. 15/790,537, filed on Oct. 23, 2017, now Pat. No. 10,719,512.

(51) Int. Cl.
*G06F 16/245* (2019.01)
*G06F 16/2453* (2019.01)
*G06F 16/22* (2019.01)

(52) U.S. Cl.
CPC .... *G06F 16/24544* (2019.01); *G06F 16/2237* (2019.01); *G06F 16/24537* (2019.01)

(58) Field of Classification Search
CPC ........... G06F 16/24544; G06F 16/2237; G06F 16/24537
(Continued)

(56) References Cited

U.S. PATENT DOCUMENTS 9,501,527 B1    11/2016    Chainani et al.
10,275,439 B2    4/2019    Mostak
(Continued)

FOREIGN PATENT DOCUMENTS

CN    201510185467 B    4/2016

OTHER PUBLICATIONS

J. Aguilar-Saborit, et al., "Ad Hoc Star Join Query Processing in Cluster Architectures", International Journal of Data Warehousing and Mining, Springer-Verlag, Aug. 2005, p. 1-10.
(Continued)

*Primary Examiner* — Hares Jami
(74) *Attorney, Agent, or Firm* — Cantor Colburn LLP; Richard Wilhelm

(57) ABSTRACT

A computer-implemented method for a partitioned bloom filter merge is provided. A non-limiting example of the computer-implemented method includes partitioning, by a processing device, a bloom filter into N equal size filter partitions. The method further includes distributing, by the processing device, each of the filter partitions to an associated node. The method further includes merging, by the processing device, the filter partitions in each of the associated nodes. The method further includes redistributing, by the processing device, the merged filter partitions to each of the N nodes. The method further includes joining, by the processing device, the merged filter partitions in each of the N nodes to assemble a complete merged bloom filter.

6 Claims, 9 Drawing Sheets

(58) Field of Classification Search
USPC .................................. 707/705, 714, 754
See application file for complete search history.

(56) References Cited

U.S. PATENT DOCUMENTS

| | | | |
|---|---|---|---|
| 10,275,493 B1* | 4/2019 | Mostak | .................... G06T 1/20 |
| 2006/0117036 A1* | 6/2006 | Cruanes | .............. G06F 16/2456 |
| 2008/0147714 A1* | 6/2008 | Breternitz | ........... G06F 12/0864 |
| 2016/0034587 A1 | 2/2016 | Barber et al. | |
| 2019/0121890 A1 | 4/2019 | Chainani et al. | |

OTHER PUBLICATIONS

J. Aguilar-Saborit, et al., "On the use of bit filters in shared nothing partitioned systems", IEEE Xplore, Innovative Architecture for Future Generation High- Performance Processors and System, Jan. 17, 2005, p. 1-9.

List of IBM Patents or Patent Applications Treated As Related; Date Filed: May 9, 2019, 2 pages.

\* cited by examiner

US 11,036,737 B2

1

PARTITIONED BLOOM FILTER MERGE FOR MASSIVELY PARALLEL PROCESSING CLUSTERED DATA MANAGEMENT

DOMESTIC PRIORITY

This application is a continuation of U.S. patent application Ser. No. 15/790,537, filed Oct. 23, 2017, the disclosure of which is incorporated by reference herein in its entirety.

BACKGROUND

The present invention generally relates to data processing, and more specifically, to partitioned bloom filter merge for massively parallel processing clustered data management.

Bloom filters are a compact data structure used to efficiently determine whether a value belongs to a set or not. Bloom filters can be used in databases to perform early filtering of probe values in join operations to reduce processing costs and memory consumption.

SUMMARY

Embodiments of the present invention are directed to a computer-implemented method for a partitioned bloom filter merge. A non-limiting example of the computer-implemented method includes partitioning, by a processing device, a bloom filter into N equal size filter partitions. The method further includes distributing, by the processing device, each of the filter partitions to an associated node. The method further includes merging, by the processing device, the filter partitions in each of the associated nodes. The method further includes redistributing, by the processing device, the merged filter partitions to each of the N nodes. The method further includes joining, by the processing device, the merged filter partitions in each of the N nodes to assemble a complete merged bloom filter.

Embodiments of the present invention are also directed to a system and a computer program product for a partitioned bloom filter merge.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

2

Figure 5:
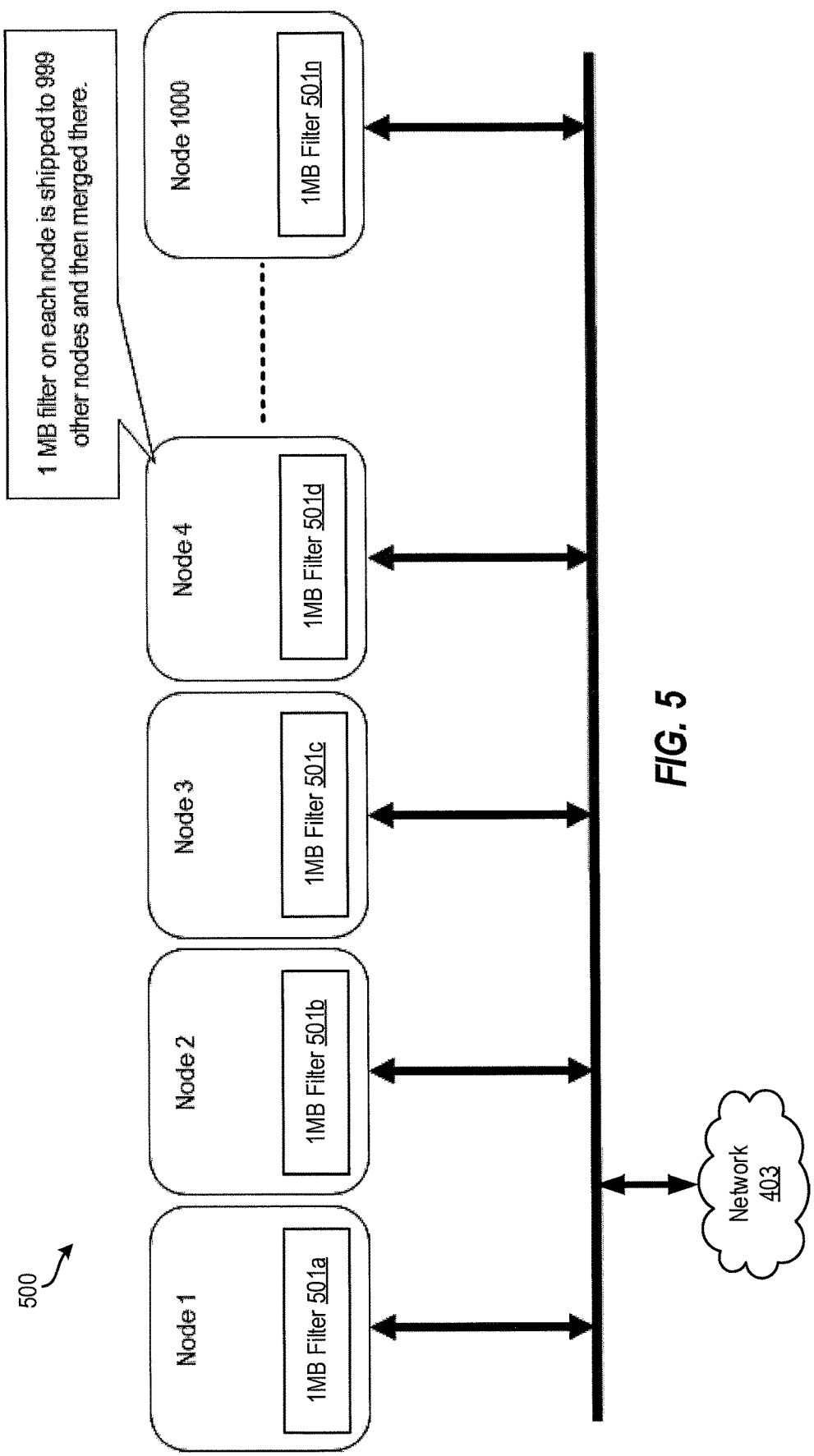
Figure 6:
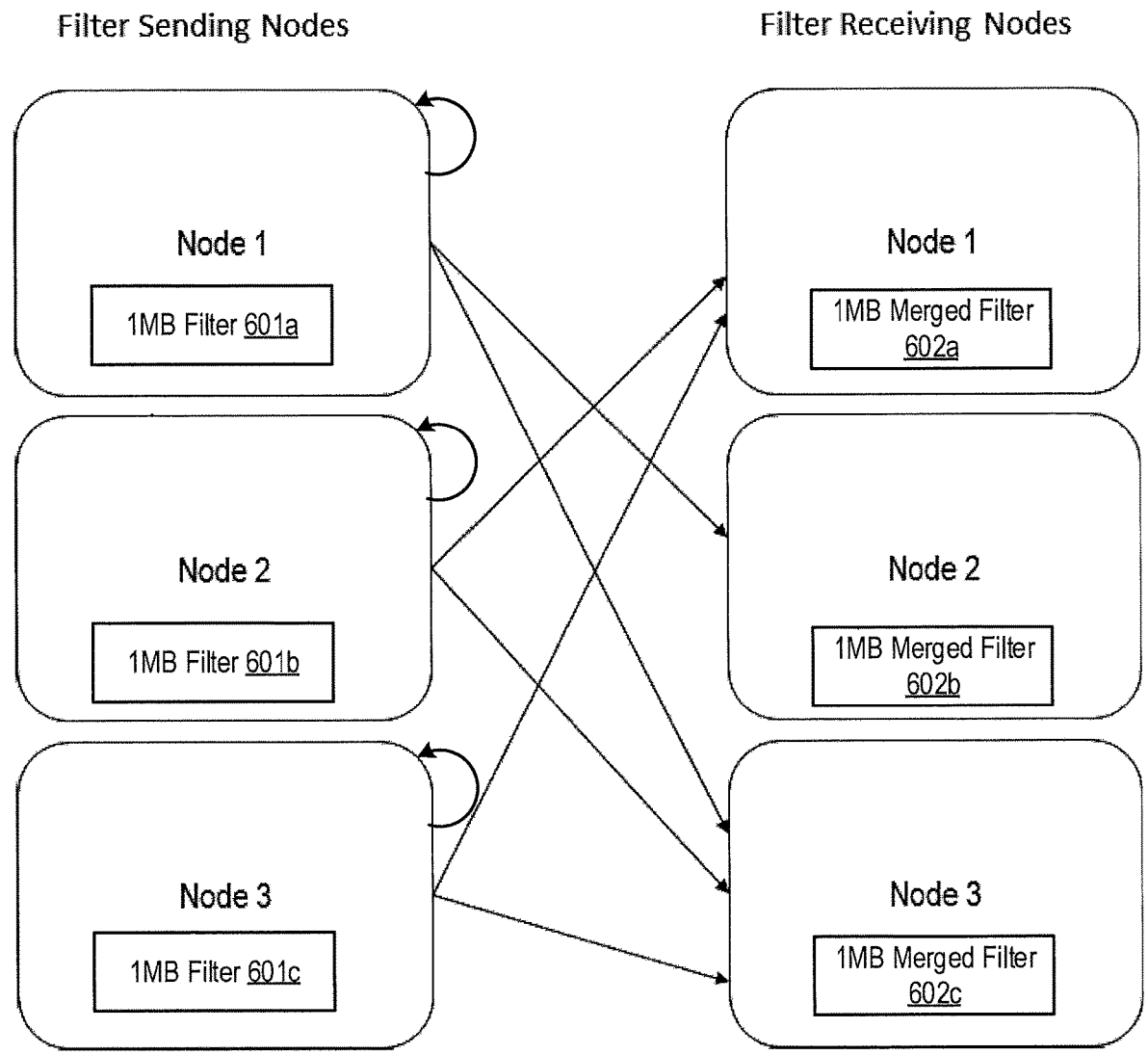
Figure 7:
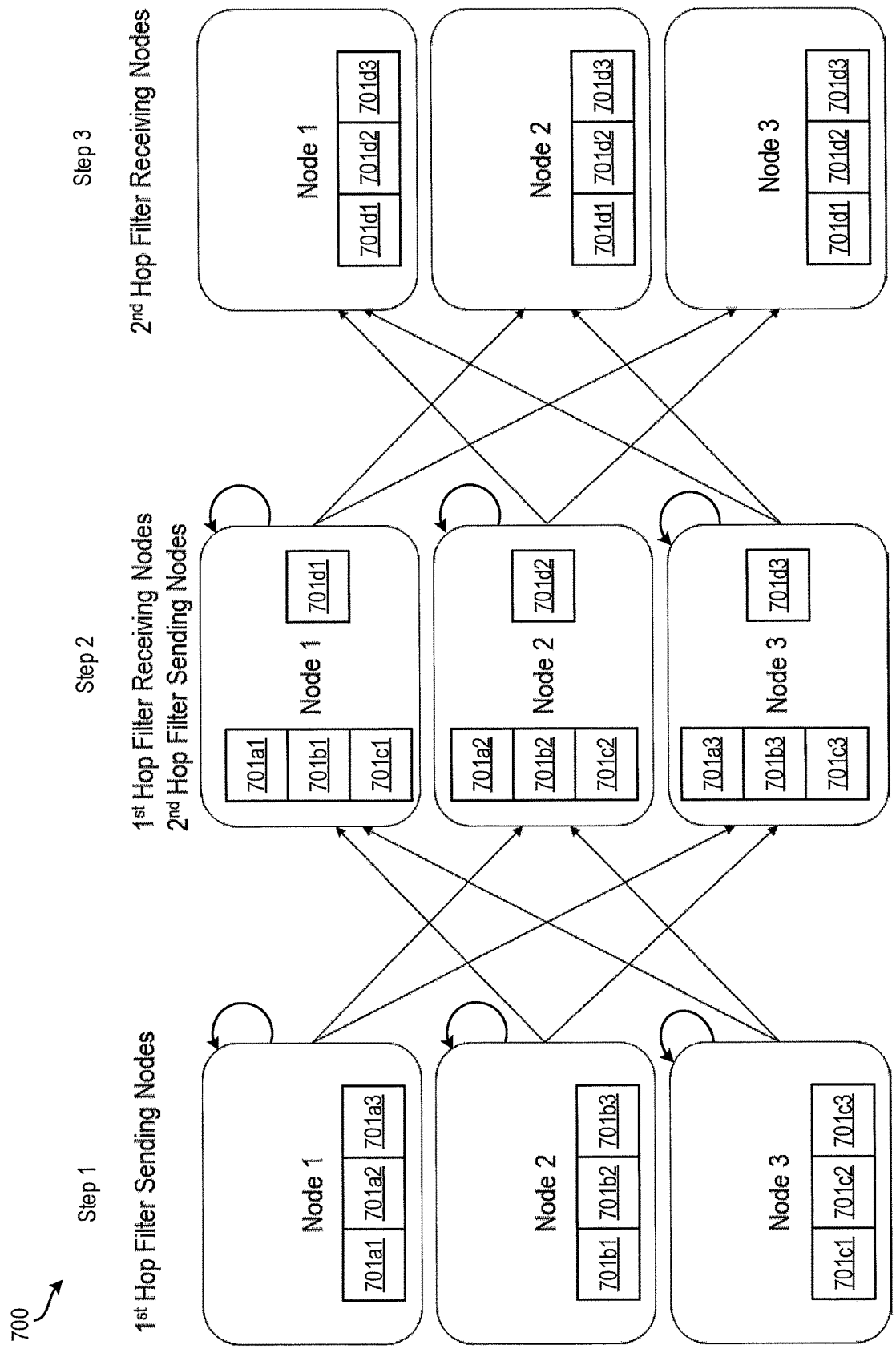
Figure 8:
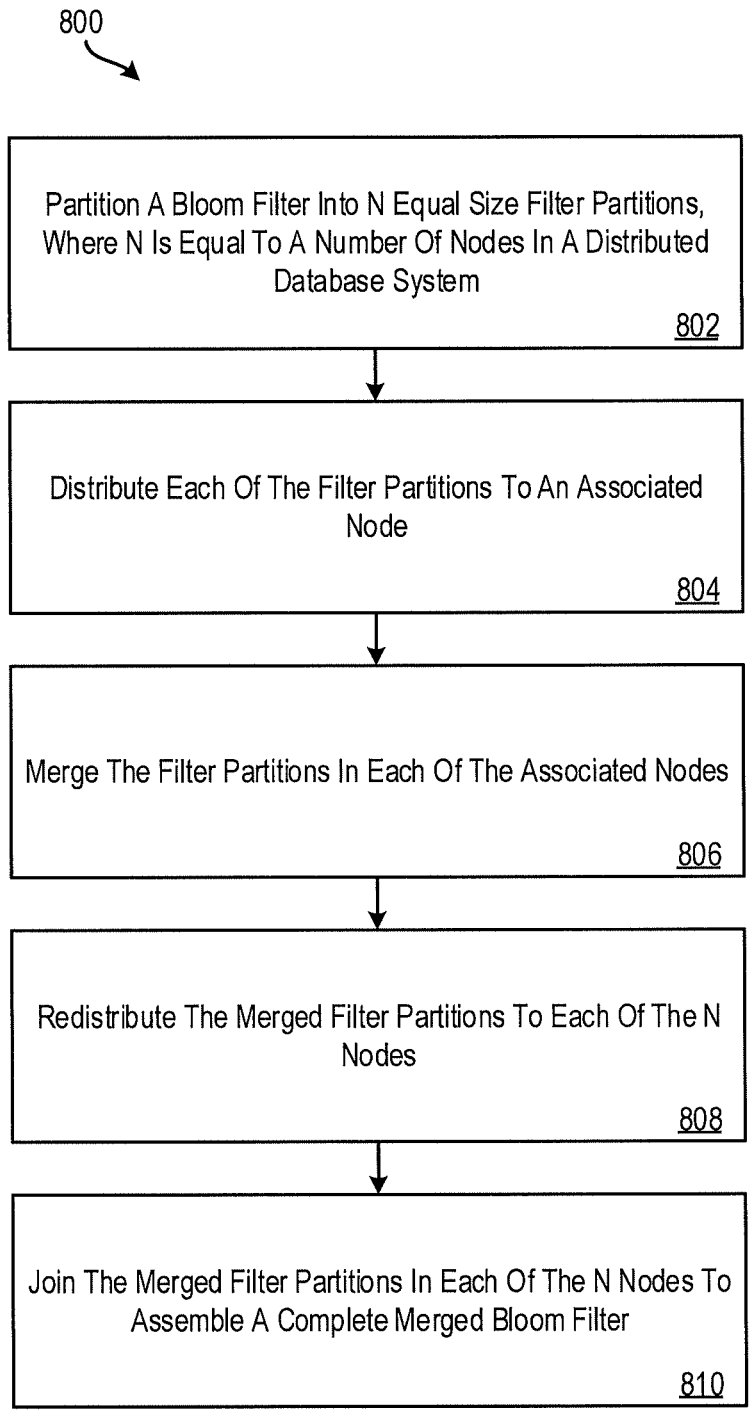
Figure 9:
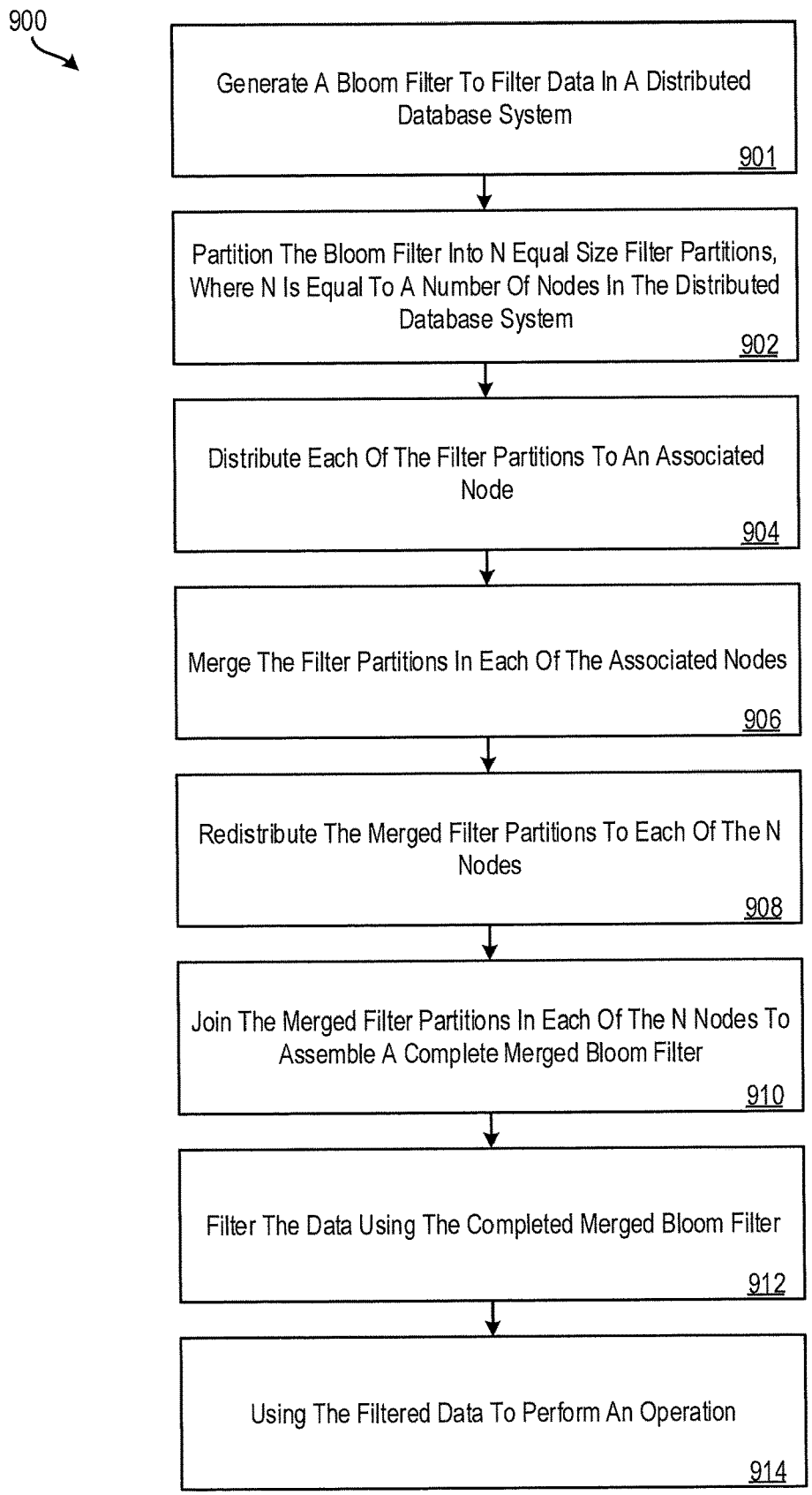

FIG. 5 depicts a block diagram of a multi-node cluster that distributes the build side and the probe side across the nodes of the cluster, according to aspects of the present disclosure;

FIG. 6 depicts a block diagram of a multi-node cluster that distributes the build side and the probe side across the nodes of the cluster, according to aspects of the present disclosure;

FIG. 7 depicts a block diagram of a multi-node cluster that distributed the build side and the probe side across the nodes of the cluster using a partitioned bloom filter merge, according to aspects of the present disclosure;

FIG. 8 depicts a flow diagram of a method for performing a partition bloom filter merge, according to aspects of the present disclosure; and FIG. 9 depicts a flow diagram of a method for performing a partition bloom filter merge, according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
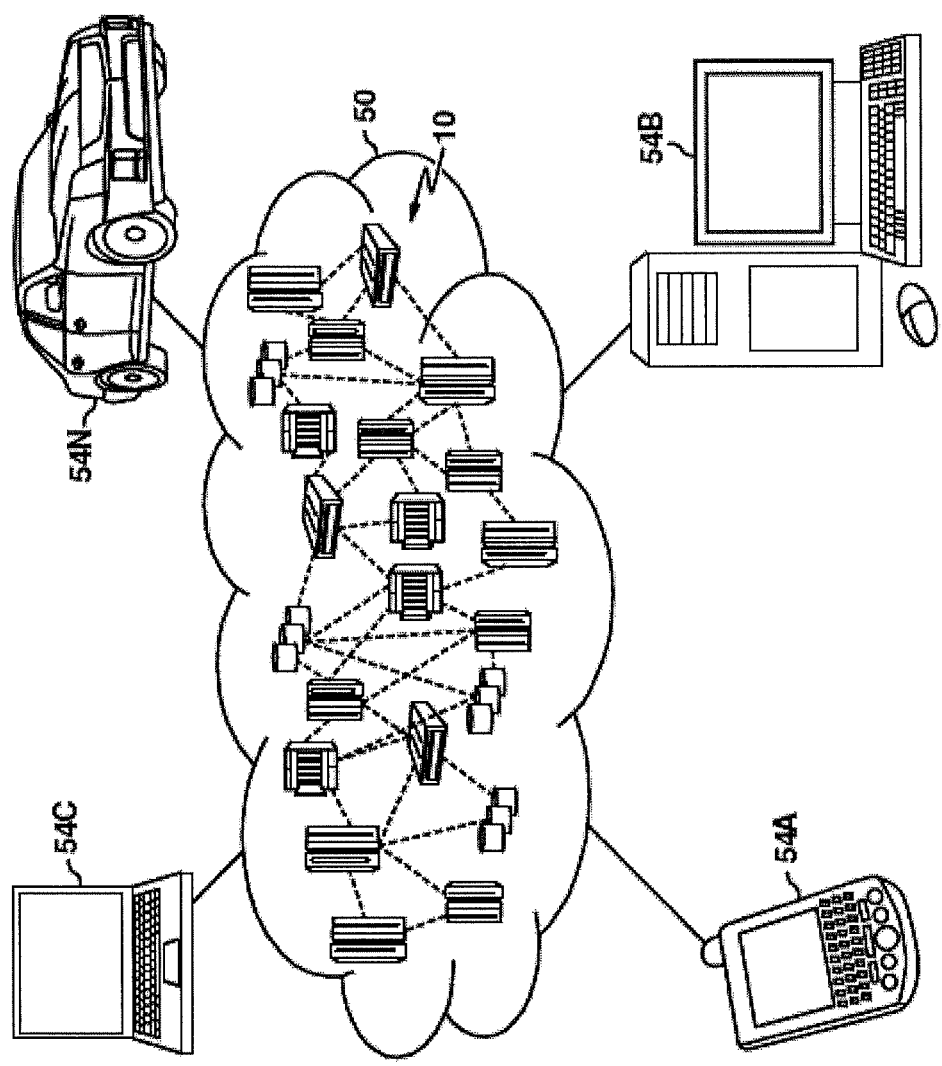
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
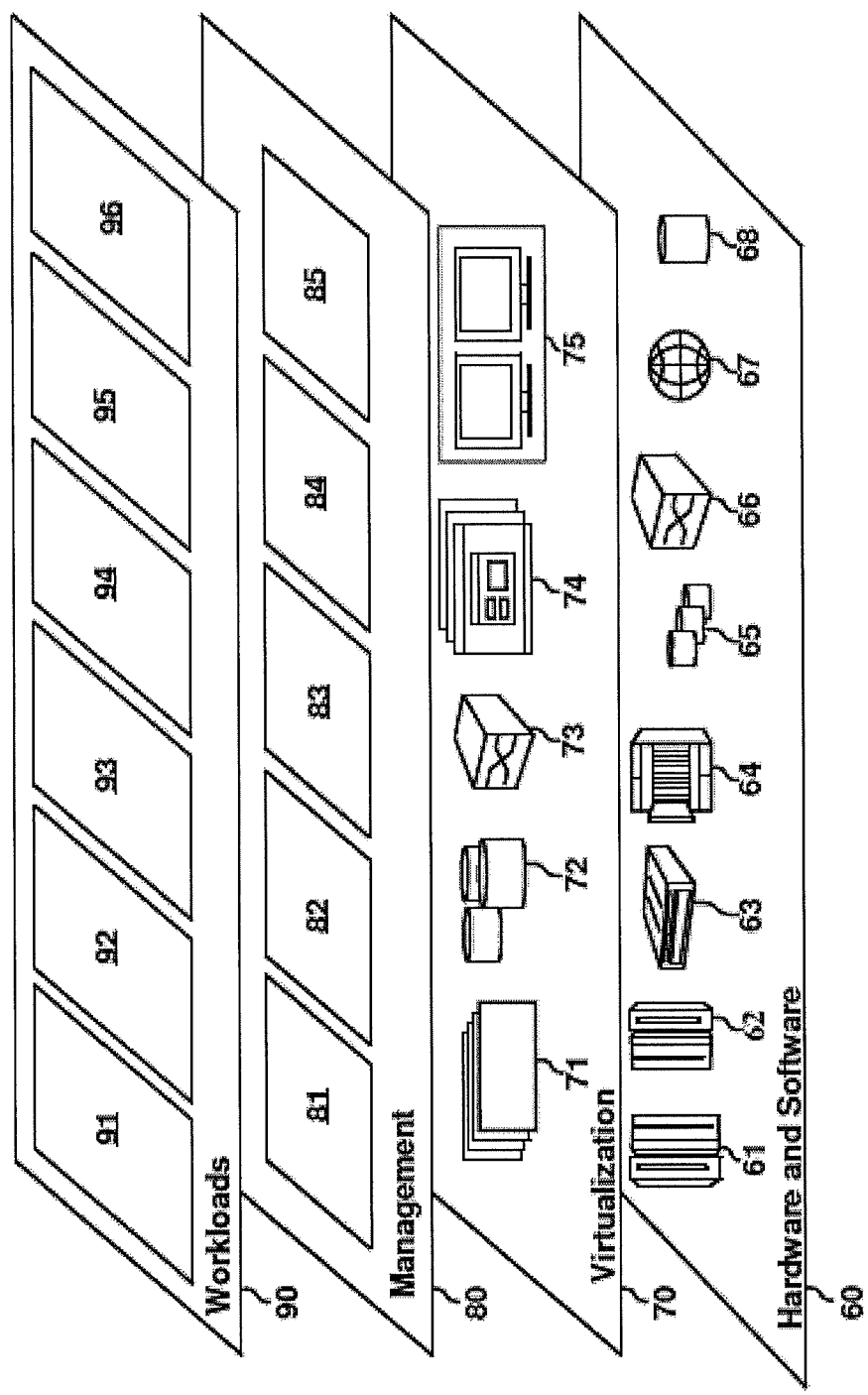
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a partitioned bloom filter merge 96.

Figure 3:
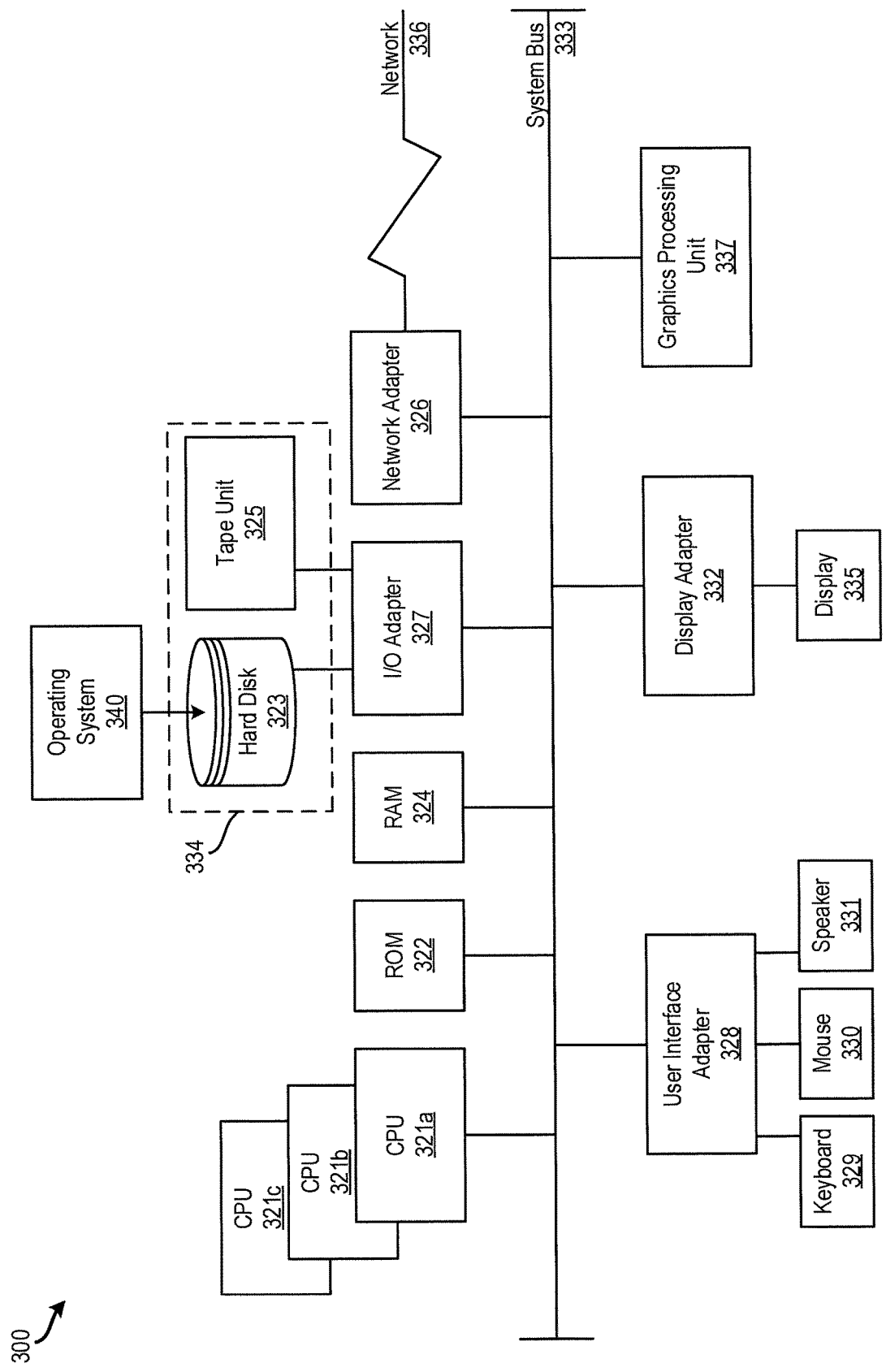
FIG. 3 depicts a processing system for implementing the techniques described herein according to aspects of the present disclosure.

It is understood that embodiments of the present invention are capable of being implemented in conjunction with any other suitable type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 may include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 24), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Figure 4:
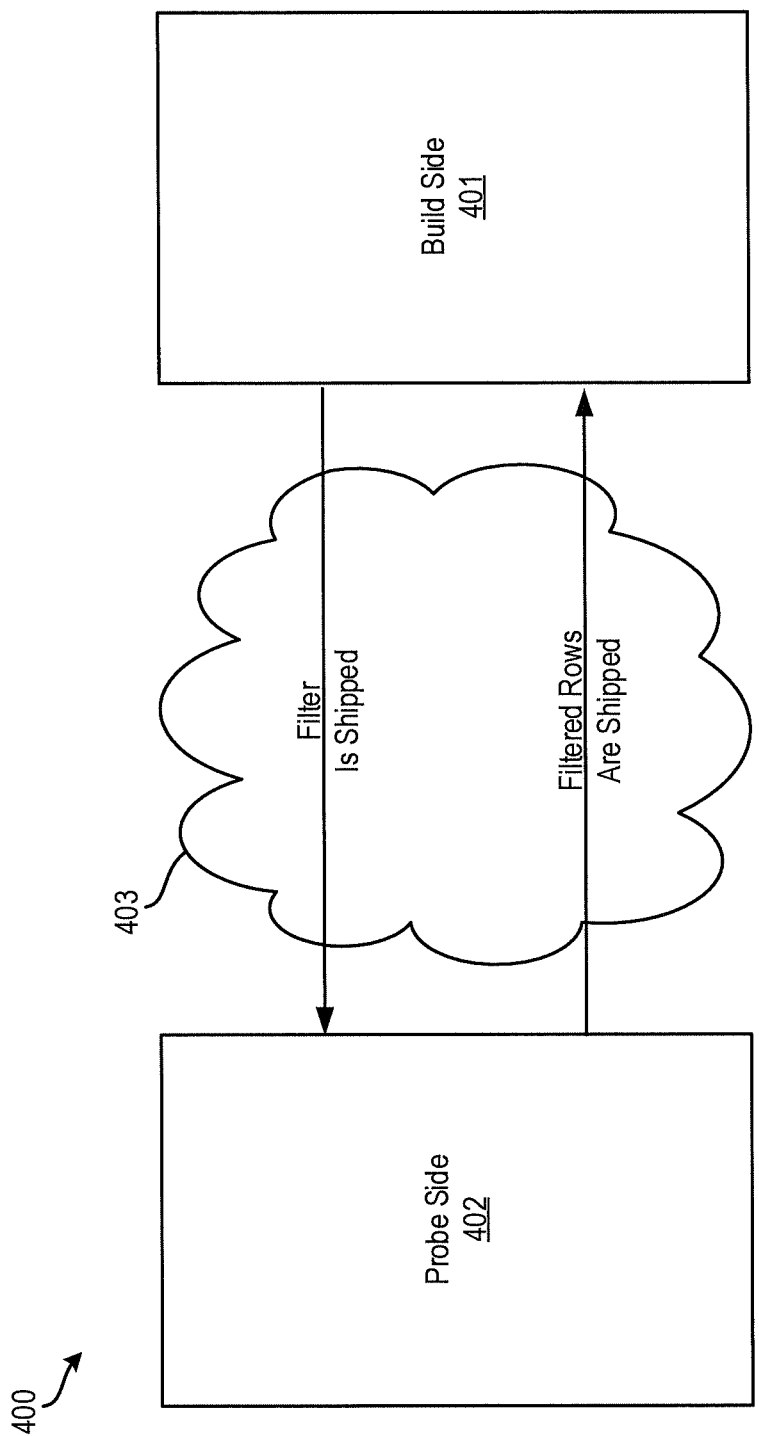
FIG. 4 depicts a block diagram of a bloom filter implementation according to aspects of the present disclosure.

Turning now to an overview of technologies that are more specifically relevant to aspects of the disclosure, techniques for a partitioned bloom filter merge for massively parallel processing clustered data management is provided. In a massively parallel processing (MPP) clustered database, a probe side of a join (e.g., a distributed hash join) can be shipped across a network to the build side. Bloom filters can be used to perform filtering of the probe data at the source (i.e., the probe side) prior to sending the data over the network back to the build side. FIG. 4 depicts a block diagram of a bloom filter implementation 400 according to aspects of the present disclosure. According to an example, the bloom filter implementation 400 can be used to perform a distributed join for a partitioned database. The build side 401 creates a filter (e.g., a bloom filter) that is used by the probe side 402 to filter data before sending the data back to the build side 401. Once the build side creates the filter, the filter is shipped to the probe side 402 over a network 403, and the probe side 402 filters rows from a database based on the filter. The filtered rows from the database are then shipped back to the build side 401 over the network 403. This can greatly reduce the amount of network traffic generated by join processing when the filter size is relatively small compared to the volume of the probe values and pay load. For example, only the filtered rows are shipped back, reducing the amount of network traffic While it may be desirable to perform this type of remote filtering on the probe side 402, it can become problematic in cases where the probe side 402 is being broadcast to many nodes on a cluster. This can result in filters also needing to be broadcast from the build side 401 and merged together to be applied against the probe data on each node hosting the probe side 402 and/or build side 401. This can cause the amount of filter data that needs to be shipped over the network 403 to grow exponentially (e.g., when using a point-to-point protocol such as TCP/IP) and thereby render the strategy ineffective for large clusters and/or large filters.

For example, FIG. 5 depicts a block diagram of a multi-node cluster 500 that distributes the build side 401 and the probe side 402 across the nodes of the cluster, according to aspects of the present disclosure. When a join is performed in the cluster 500 using a bloom filter, a large amount of network traffic is generated that can cause network congestion and latency. In this example, a 1 MB filter (e.g., filter 501a, 501b, 501c, 501d . . . 501n (collectively "filter 501")) is built from table data on each node (e.g., node 1, node 2, node 3, node 4 . . . node 1000) in the cluster 500. The 1 MB filter 501 is broadcast to every other node in the cluster. For example, node 1 broadcasts to node 2, node 3, node 4 . . . node 1000; node 2 broadcasts to node 1, node 3, node 4 . . . node 1000; etc. Assuming each node connects to every other node in the cluster 500 (e.g., through a standard TCP/IP socket), the total network traffic generated is 1 MB*999 (e.g., from one node to the other 999 nodes in the cluster 500)*1000 (total number nodes in the cluster 500) or close to 1 TB of data. This is even though each node merges the filters 501 bitwise into a single 1 MB filter in order to keep the memory footprint of filters manageable.

This exponential growth characteristic of the cluster 500 effectively eliminates the ability to apply filtering for broadcast outer joins which limits the number of plan choices available for performing join processing in large clusters. A similar problem occurs when the filter is built on the join probe side in order to reduce the number of rows that may be broadcast from a large join builds side.

Although various approaches have been attempted to reduce network traffic in such situations, these approaches are ineffective and/or problematic. For example, one possible approach for avoiding the exponential network traffic is to implement network communications using the UDP protocol, which enables network broadcasting of filters. However, this approach is disadvantageous because it requires the database to implement a reliability layer on top of UDP which adds to product complexity and software maintenance and because relying on a network broadcast model precludes the database system from leveraging hardware or features that operate only on a point-to-point basis (e.g., SSL encryption, RDMA optimized communications, etc.).

Another possible approach for avoiding the exponential network traffic is to nominate one node as a victim node that receives all the filters and performs the filtering. However, this can cause a bottleneck effect at the victim node and can introduce additional latency into the system.

FIG. 6 depicts a multi-node cluster 600 that distributes the build side and the probe side across the nodes of the cluster, according to aspects of the present disclosure. The multi-node cluster 600 includes three nodes: node 1, node 2, and node 3. Each node includes a 1 MB filter (e.g., node 1 includes a 1 MB filter 601a, node 2 includes a 1 MB filter 601b, and node 3 includes a 1 MB filter 601c). The filters 601a, 601b, 601c are collectively referred to as "filters 601." The filters 601 are distributed from each node to the other nodes over a network (e.g., the network 403) as depicted by the arrows in FIG. 6.

Network usage (i.e., the amount of bandwidth consumed in the network as a result of the transferred filters) is a product of the filter size and the number of nodes. For example, network usage is calculated by multiplying the filter size by the number of nodes and by the number of nodes minus one (e.g., 1 MB*3*(3−1)=6 MB). As the number of nodes increases, the network usage increases exponentially. For example, a 1 MB filter size in a four-node cluster would be 12 MB (i.e., 1 MB*4*(4−1)) and a 1 MB filter size in a five-node cluster would be 20 MB (i.e., 1 MB*5*(5−1)).

The present techniques address the above-described problems by reducing network usage when the filter is transmitted between nodes by implementing a partitioned bloom filter merge. That is, the present techniques transmit the filter by partitioning the filter, distributing the filter partitions, merging the filter partitions, redistributing the merged filter partitions, and joining the merged filter partitions to regenerate the bloom filter.

In particular, the present techniques provide for handling the case where bloom filters need to be broadcast from each node in a cluster to every other node and then merged on the receiving end on each node into a single filter to apply against a data set partitioned across those nodes. As mentioned a common use case for this scenario would be when performing filtering on a broadcast outer join operation in a distributed database system. The present approach provides advantages over existing techniques in that it eliminates the exponential network traffic growth characteristic and reduces the net cost of the merge processing across the cluster.

Generally, aspects of the present disclosure operate by partitioning the source filter produced by each node into N equal size ranges where N is the number of nodes in the cluster. Each node then enumerates the ranges using a common ordering and sends each range in order to a different node in the cluster. Leveraging the common ordering, each node receives all the filters for a given range, merges them together, and then broadcasts the final merged filter range to all nodes. Each node as a final step then assembles or joins (e.g., concatenates) the merged ranges together into a complete merged filter which can be applied to each node's local dataset.

With this partitioned merge technique, the total network traffic for broadcasting and merging an M byte filter is (M/N)*(N−1)*N bytes for each node to distribute the partitioned filter to all other nodes for merging and another (M/N)*(N−1)*N bytes to broadcast the merged ranges to all other nodes in the cluster for a total of 2*M*(N−1) bytes shipped.

This represents a savings of a factor of N in network traffic over existing techniques. According to an example of broadcasting and merging a 1 MB filter to 1000 nodes, the present techniques generate just under 2 GB of network traffic rather than 1 TB when exchanging filters according to the example described above with respect to FIG. 5. In addition, the present techniques provide a divide and conquer strategy for merging the filter, which results in a reduction of the processing cost of the merge by a factor of N across the cluster as each node now avoids any redundant merge processing.

FIG. 7 depicts a block diagram of a multi-node cluster 700 that distributed the build side and the probe side across the nodes of the cluster using a partitioned bloom filter merge, according to aspects of the present disclosure. The multi-node cluster 700 includes three nodes: node 1, node 2, and node 3. Each node includes a 1 MB filter (e.g., node 1 includes a 1 MB filter 701a, node 2 includes a 1 MB filter 701b, and node 3 includes a 1 MB filter 701c). The filters 701a, 701b, 701c are collectively referred to as "filters 701." The filters 701 are distributed from each node to the other nodes over a network (e.g., the network 403) as depicted by the arrows in FIG. 7.

FIG. 7 shows that the partitioned bloom filter merge includes, for example, 3 steps with two "hops" or transfers of the filters 701 occurring between the steps. During step 1, each of the nodes partitions their respective filters 701 into N equal size filter partitions where N represents the number of nodes (e.g., 3 nodes in the example of FIG. 7). For example, the filter 701a is partitioned into three equal size filter partitions 701a1, 701a2, and 701a3; the filter 701b is partitioned into three equal size filter partitions 701b1, 701b2, and 701b3; and the filter 701c is partitioned into three equal size filter partitions 701c1, 701c2, and 701c3.

During a first hop or transfer between step 1 and step 2, the filter partitions are distributed to a node associated with each filter partition. For example, each of the filter partitions 701a1, 701b1, and 701c1 are distributed to node 1, each of the filter partitions 701a2, 701b2, and 701c2 are distributed to node 2, and each of the filter partitions 701a3, 701b3, and 701c3 are distributed to node 3. The nodes 1, 2, 3 then each merge the filter partitions. For example, node 1 merges the filter partitions 701a1, 701b1, and 701c1 into a merged filter partition 701d1. Similarly, node 2 merges the filter partitions 701a2, 701b2, and 701c2 into a merged filter partition 701d2, and node 3 merges the filter partitions 701a3, 701b3, and 701c3 into a merged filter partition 701d3.

The merge can occur using a bit map merge by applying an "or" operation between each part of the filter partition. For example in node 1 during the second step, filter 701a1 is OR'd with filter 701b1 and the result is OR'd with filter 701c1 to produce the merged filter 701d1. This effectively retains each part of the filter partition within each node while producing a merged filter partition that is the same size as the individual filter partitions. For example, if each filter partition 701a1, 701b1, 701c1 is 1 MB/3, then the merged filter partition is also 1 MB/3. During a second hop or transfer between step 2 and step 3, the merged filter partitions are redistributed to each of the nodes. The nodes then join the merged filter partitions to reassemble the bloom filter.

Because the bloom filter is merged in step 2 using a bitmap to retain each part of the filter partition to produce a merged filter partition that is the same size as the individual filter partitions, network usage is drastically reduced, thereby improving performance of the processing system using the bloom filter (such as for a distributed hash join operation). During the first hop, the network usage is equal to the size of the filter divided by the number of nodes times the number of nodes times the number of nodes minus 1. For example, for a 1 MB filter, the network usage during the first hop is 1 MB/3*3*(3−1)=2 MB. Similarly, during the second hop, the network usage is equal to the size of the filter divided by the number of nodes times the number of nodes times the number of nodes minus 1. For the example 1 MB filter, the network usage during the second hop is 1 MB/3*3*(3−1)=2 MB. Accordingly, the total network usage is the sum of the two hops (e.g., 2 MB+2 MB=4 MB). This is a drastic reduction in network usage from direct filter transmissions, as illustrated in FIG. 6. Accordingly, the functioning of processing system implementing this technique is improved by reducing network traffic, network latency, and the like. As the number of nodes grows, the network usage grows at a much slower pace than existing solutions.

FIG. 8 depicts a flow diagram of a method 800 for performing a partition bloom filter merge, according to aspects of the present disclosure. The method 800 can be implemented, for example, by the processing system 300 of FIG. 3, in the cloud computing environment 50 of FIG. 1, or by any other suitable processing system or device.

At block 802, the processing system partitions a bloom filter into N equal size filter partitions, where N is equal to a number of nodes in a distributed database system. At block 804, the processing system distributes each of the filter partitions to an associated node. At block 806, the processing system merges the filter partitions in each of the associated nodes. At block 808, the processing system redistributes the merged filter partitions to each of the N nodes. At block 810, the processing system joins the merged filter partitions in each of the N nodes to assemble a complete merged bloom filter.

Additional processes also may be included, and it should be understood that the processes depicted in FIG. 8 represent illustrations and that other processes may be added or existing processes may be removed, modified, or rearranged without departing from the scope and spirit of the present disclosure.

FIG. 9 depicts a flow diagram of a method 900 for performing a partition bloom filter merge, according to aspects of the present disclosure. The method 900 can be implemented, for example, by the processing system 300 of FIG. 3, in the cloud computing environment 50 of FIG. 1, or by any other suitable processing system or device.

At block 901, the processing system generates a bloom filter to filter data in a distributed database system. The bloom filter can be generated as part of a join operation, such as a distributed hash join operation, for example.

At block 902, the processing system partitions a bloom filter into N equal size filter partitions, where N is equal to a number of nodes in the distributed database system. At block 904, the processing system distributes each of the filter partitions to an associated node. At block 906, the processing system merges the filter partitions in each of the associated nodes. At block 908, the processing system redistributes the merged filter partitions to each of the N nodes. At block 910, the processing system joins the merged filter partitions in each of the N nodes to assemble a complete merged bloom filter.

At block 912, the processing system filters the data using the reassembled bloom filter. For example, the bloom filter can be applied to filter rows of the database. At block 914, the processing system returns the filter data to enable an operation to be performed (e.g., a distributed hash join operation) using the filtered data.

Additional processes also may be included, and it should be understood that the processes depicted in FIG. 9 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    partitioning, by a processing device, a bloom filter at each node of a plurality of nodes into N equal size filter partitions, wherein N is the number of the plurality of nodes;
    distributing, by the processing device, each of the filter partitions among the plurality of nodes such that each node of the plurality of nodes is associated with one of the filter partitions from each of the plurality of nodes;
    merging, by the processing device, the filter partitions in each of the plurality of nodes;
    redistributing, by the processing device, the merged filter partitions to each of the plurality of nodes; and
    joining, by the processing device, the merged filter partitions in each of the plurality of nodes to assemble a complete merged bloom filter.

2. The computer-implemented method of claim 1, wherein the filter partitions are bitmaps, and wherein merging the filter partitions comprises performing a bitmap merge on the bitmaps.

3. The computer-implemented method of claim 2, wherein performing the bitmap merge comprises applying an OR operation on the bitmaps.

4. The computer-implemented method of claim 1, further comprising generating the bloom filter to filter data in a distributed database system prior to partitioning the bloom filter.

5. The computer-implemented method of claim 1, further comprising filtering the data using the complete merged bloom filter by applying the complete merged bloom filter to a data table to filter rows of data based on the filter.

6. The computer-implemented method of claim 5, further comprising using the filtered data to perform an operation.

* * * * *